March 8, 1960     E. J. RENNER     2,927,381
EDUCATIONAL AID AND AMUSEMENT DEVICE
Filed Sept. 21, 1956
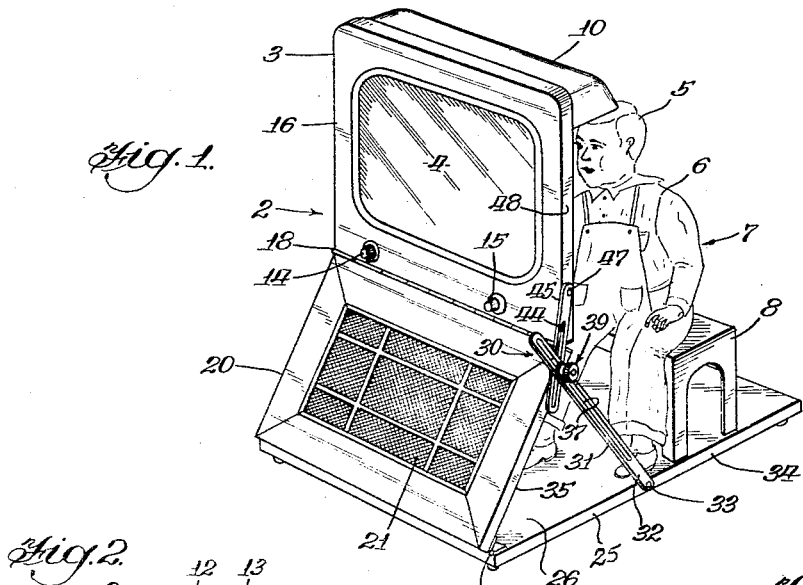
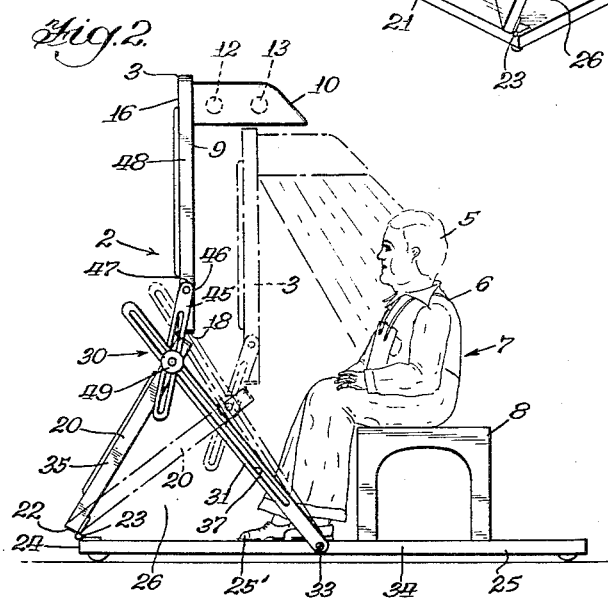
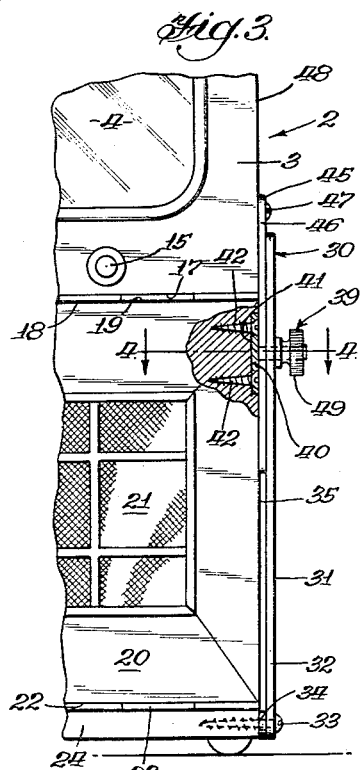
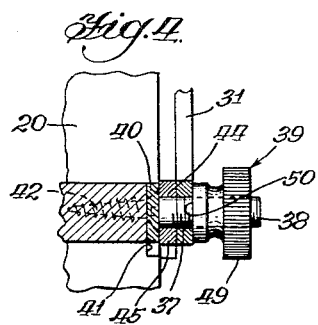
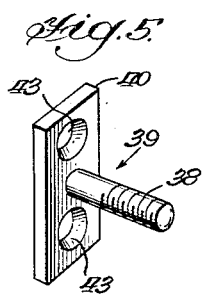
INVENTOR.
Earl J. Renner
BY John J. Kowalik
Atty.

United States Patent Office

2,927,381
Patented Mar. 8, 1960

2,927,381
EDUCATIONAL AID AND AMUSEMENT DEVICE

Earl J. Renner, Chicago, Ill.

Application September 21, 1956, Serial No. 611,274

2 Claims. (Cl. 35—8)

This invention relates to educational aids and more specifically to means for inducing children to act.

It is common knowledge that as a rule children are usually introverted and extremely shy to perform pantomimes, give recitations, sing, etc. before an audience. The most effective means of overcoming their reticence is to conduct instruction or give performances as group games and particularly by employing suitable props. Such a prop should have universal appeal and be familiar to the children so that they instinctively will vie with one another for the privilege of being selected to play with it without concentrating on their presentation so that it is natural and uninhibited.

It is therefore a general object of the invention to provide a novel prop in the form of a mock television apparatus which comprises a false front in the form of a screen behind which children are adapted to act.

More particularly the invention contemplates a novel arrangement of parts comprising the false front having several portions which are adjustable and including a screen or window which is positionable vertically or at an angle in order to properly frame the subject therebehind and to control the lighting thereof by a light structure carried on one of the portions of the fake front.

Specifically, the invention provides a false front including an upper window or screen portion hinged to a bottom baffle portion and the baffle portion being pivotally connected to a base so that the upper and lower portions fold horizontally, there being provided means for holding the upper and lower portions at various angular positions with respect to each other to bring the screen up and down in accordance with the height of the child to frame the youngster, the lower portion and the base further being arranged to provide an accommodation space for the feet of the subject so that he may move up close to the screen.

A still further object is to provide an inexpensive and practical device of the class described wherein the parts are foldable into a compact and portable assembly for transport as well as storage.

These and other objects of the invention will become more apparent from the specification and the drawings, wherein:

Figure 1 is a front and side perspective view of the device with the subject shown in acting position therebehind;

Figure 2 is a side elevational view of the device and subject;

Figure 3 is an enlarged fragmentary front view with an exemplary form of adjusting device shown partially in vertical section;

Figure 4 is a further sectional view taken substantially on the line 4—4 of Figure 3, and Figure 5 is an enlarged perspective view of the mounting plate and stud of the locking device.

Describing the invention in detail, the prop or game device comprising a screen generally designated 2 is in the form of a false front of a television apparatus comprising an upper portion or panel 3 which includes a central glazed window 4 within which is adapted to be framed the head and shoulders 5 and 6 of a child 7 seated behind the screen on a small bench or stool 8. The top part 3 may be provided on its back side 9 with a light reflector shield 10 adjacent to its upper edge and within the shield may be provided several different colored lights 12 and 13 operated by switches 14 and 15 on the front side 16 of the upper portion, said switches simulating the volume control and channel selector, respectively. Of course, the lights may be disposed at opposite sides or at the top and bottom of the screen. The lower edge 17 (Figure 3) of the top portion is connected on a horizontal axis by a hinge 18 to the upper edge 19 of the lower or baffle portion 20 of the false front. The baffle portion 20 may include a central grille work 21 and along its lower edge portion 22 may be connected by hinge 23 on a horizontal axis to the forward extremity 24 of the base or support portion 25 which extends rearwardly behind the false front. This base portion is shown merely by way of illustration as a pedestaled flat baseboard but it may only comprise a very narrow portion in the form of a side rail which would run along a side of the front.

The bench 8 which is removable is shown standing upon the platform 25 and is movable toward and away from the false front in accordance with the desires of the subject whose feet 25' may project into the accommodation space 26 developed between the platform or floor and the bottom panel 20 as it is inclined rearwardly in accordance with the body height of the subject 7 to position the screen at proper elevation.

The top and bottom portions of the false front are adapted to be locked in a plurality of selective angular positions by the combined bracing and holding means generally designated 30. It comprises a diagonal brace element 31 which may be pivoted at its lower end 32 on a generally horizontal axis as at 33 to the lateral edge 34 of the platform 25, at a point intermediate the ends thereof. The base brace 31 extends diagonally upwardly and forwardly across the adjacent lateral edge 35 of the bottom panel and is provided with a longitudinal slot 37 which receives a stud 38 therethrough of the fastening element 39 which includes a mounting plate 40 integral with the stud. The plate is countersunk as at 41 in the edge 35 and fastened thereto by screws 42 through holes 43 in the plate. The stud shank 38 also passes through an elongated slot 44 (Figure 1) in the adjusting strap or brace 45 which controls the angularity of the upper ando lower panels.

The strap element 45 extends upwardly from the stud and at its upper end 46 is pivoted by a screw 47 to the lateral or side edge 48 of the upper panel 3 .

The stud has a knurled nut 49 threaded thereon and disposed outwardly of straps 31 and 45 and the nut has its inner edge 50 tightened against the outer side of strap 31 which is drawn up tight against strap 45 which in turn is pressed tightly against the plate 40. Thus the elements 31 and 45 are tightly frictionally engaged and the panels 3 and 20 releasably locked in selected positions as best seen in Figure 2 in full and in phantom lines.

In order to fold the device for transport or storage, the nut 49 is loosened and the entire front swung downwardly onto the platform about hinge 23. Hinge 18 will accommodate upward tilting of the top portion to account for the shield 10 which may be removably connected as by screws, not shown, to portion 3. The bench would be removed before holding.

The deluxe unit has been shown, but the device may be made of cardboard or the like and the panels and base hinged by creasing at appropriate areas.

Thus it will be understood that a novel amusement device is provided wherein not only are the front panel portions adjustable to frame individuals of differing height but the arrangement of parts permits adjustment of the lights as well as accommodating the subject close to the screen in providing space for his legs. The screen may be provided with an unbreakable plastic window.

It will be further understood that the device herein set forth in the drawings and foregoing specification is merely exemplary in carrying out the principles of the invention and that the scope of the invention is to be determined only by the nature of the appended claims.

I claim:

1. An educational aid comprising a simulated television front including upper and lower portions, means mounting said upper portion for swinging movement about a generally horizontal axis with respect to said lower portion, a viewing window in said upper portion, said front presenting an audience viewing side and having a back side behind which a participant is adapted to perform, and a directed light source carried by said upper portion adjustable with respect to said participant by swinging said upper portion, and means pivotally mounting said lower portion about a horizontal axis for adjusting movement in a direction toward and away with respect to the participant.

2. An educational aid comprising a simulated television front portion comprising upper and lower panels, said upper panel comprising a window and said lower portion simulating a baffle, said upper panel having a lower edge disposed above the upper edge of the lower panel and hinged thereto for swinging movement about a generally horizontal axis, a base support pivotally connected to said lower panel for supporting said front portion for swinging movement about a generally horizontal axis, a first adjusting arm having an upper end pivoted to a lateral edge of the upper panel and extending downwardly therefrom, a locking member connected to a lateral edge of the lower panel and extending through an elongated slot in said first arm, a second arm extending diagonally between said base support and said locking member and having an elongated slot receiving the locking member therethrough and having a lower end pivoted to said support, and a locking nut threaded upon said locking member for tightly frictionally engaging said arms with said locking member to hold said panels in selected adjusted positions relative to each other and to said base support.

References Cited in the file of this patent

UNITED STATES PATENTS

| | | |
|---|---|---|
| 218,893 | McIlvenna et al. | Aug. 26, 1879 |
| 1,518,680 | Arnot | Dec. 9, 1924 |
| 1,571,131 | McIntosh | Jan. 26, 1926 |
| 1,798,893 | Myers et al. | Mar. 31, 1931 |
| 2,418,286 | Austin | Apr. 1, 1947 |
| 2,430,662 | Barton | Nov. 11, 1947 |
| 2,634,544 | Belden | Apr. 14, 1953 |